United States Patent
Han

(10) Patent No.: US 7,096,008 B2
(45) Date of Patent: Aug. 22, 2006

(54) SERVICE METHOD IN A MOBILE TERMINAL

(75) Inventor: Mi-Kyung Han, Kyongsangnam-do (KR)

(73) Assignee: Samsung Electronics Co., Ltd., (KR)

( * ) Notice: Subject to any disclaimer, the term of this patent is extended or adjusted under 35 U.S.C. 154(b) by 904 days.

(21) Appl. No.: 09/897,314

(22) Filed: Jul. 2, 2001

(65) Prior Publication Data

US 2002/0094847 A1    Jul. 18, 2002

(30) Foreign Application Priority Data

Jan. 16, 2001    (KR) ................................. 2001-2365

(51) Int. Cl.
*H04B 1/38*    (2006.01)
*H04M 1/00*    (2006.01)
*H04M 3/42*    (2006.01)
*H04Q 7/32*    (2006.01)
*H04Q 7/38*    (2006.01)

(52) U.S. Cl. .............................. 455/414.1; 379/201.01; 455/466; 455/512; 455/566

(58) Field of Classification Search ........... 379/201.01, 379/208.01; 455/414.1, 512, 566, 567, 466
See application file for complete search history.

(56) References Cited

U.S. PATENT DOCUMENTS

| | | | | |
|---|---|---|---|---|
| 5,666,364 A | * | 9/1997 | Pierce et al. ................. | 370/455 |
| 6,061,559 A | * | 5/2000 | Eriksson et al. .......... | 455/435.3 |
| 6,546,263 B1 | * | 4/2003 | Petty et al. .................. | 455/566 |

* cited by examiner

*Primary Examiner*—Harry S. Hong
(74) *Attorney, Agent, or Firm*—Dilworth & Barrese LLP

(57) ABSTRACT

There is provided a service method in a mobile terminal supporting a telephone call service and a plurality of additional services. Upon receipt of a priority designation request for a first selected one of the additional services from a user, the mobile terminal designates the first selected additional service as a high-priority service. Upon receipt of an incoming telephone call during a selected second one of the additional services, the mobile terminal determines whether the first selected additional service is identical to the second selected additional service. When the first selected additional service is identical to the second selected additional service, the mobile terminal maintains the selected additional service.

14 Claims, 4 Drawing Sheets

SERVICE METHOD IN A MOBILE TERMINAL

PRIORITY

This application claims priority to an application entitled "Service Method in a Mobile Terminal" filed in the Korean Industrial Property Office on Jan. 16, 2001 and assigned Ser. No. 2001-2365, the contents of which are hereby incorporated by reference.

BACKGROUND OF THE INVENTION

1. Field of the Invention

The present invention relates generally to a mobile terminal, and in particular, to a service method in a mobile terminal.

2. Description of the Related Art

A mobile terminal, i.e., a typical mobile telephone, provides various additional services such as a phonebook function for recording some 100 phone numbers in association with names of the phone number users' and a schedule management function for managing important schedules of the telephone user, as well as the existing telephone call service. The mobile terminal also supports a short message service (SMS). In addition, the mobile terminal has recently developed into a complex mobile terminal capable of supporting various multimedia services. In most cases, however, the telephone call service has priority over the additional services.

FIG. 1 illustrates an exemplary operation in which the conventional mobile terminal gives priority to the telephone call service. More specifically, FIG. 1 shows how the mobile terminal operates upon receipt of an incoming call while a user makes an SMS composition. FIG. 1 shows various displays of a display unit of the mobile terminal during this operation.

To make an SMS composition, the mobile terminal user selects an "OUTGOING MESSAGE" item by selecting an item number 2 on a Message Management menu shown in FIG. 1. Upon receipt of an incoming call while the user makes an SMS composition, the mobile terminal automatically stores the SMS message now under composition in a memory and at the same time, displays a message, e.g., "MESSAGE NOW UNDER COMPOSITION IS STORED", on the display unit. Subsequently, the mobile terminal switches from the additional service for the SMS composition to the telephone call service. In this state, if the user presses a CALL key, the mobile terminal transitions to a telephone call state and at the same time, displays a message "BUSY".

As described above, in the conventional mobile terminal, the telephone call service takes precedence over the additional services, so that a previously executed additional service resumes after completion of the telephone call service. Therefore, the conventional mobile terminal may be inconvenient to the user who desires to give priority to a specified one of the additional services rather than the telephone call service.

SUMMARY OF THE INVENTION

It is, therefore, an object of the present invention to provide a service method capable of freely giving priority to either a telephone call service or an additional service in a mobile terminal.

To achieve the above and other objects, there is provided a service method in a mobile terminal supporting a telephone call service and a plurality of additional services. Upon receipt of a priority designation request for a first selected one of the additional services from a user, the mobile terminal designates the first selected additional service as a high-priority service. Upon receipt of an incoming call during a selected second one of the additional services, the mobile terminal determines whether the first selected additional service is identical to the second selected additional service. When the first selected additional service is identical to the second selected additional service, the mobile terminal maintains the selected additional service.

Further, the mobile terminal informs the user that the selected additional service is designated as a high-priority service, after designating the selected additional service as a high-priority service. To inform the user of the priority designation of the selected additional service, the mobile terminal displays a priority icon on a display unit of the mobile terminal.

Further, the mobile terminal releases priority over the designated additional service, upon receipt of a priority release request from the user during the designated additional service.

Further, the mobile terminal informs the user of priority release after releasing priority over the designated additional service, by removing the priority icon displayed on the display unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
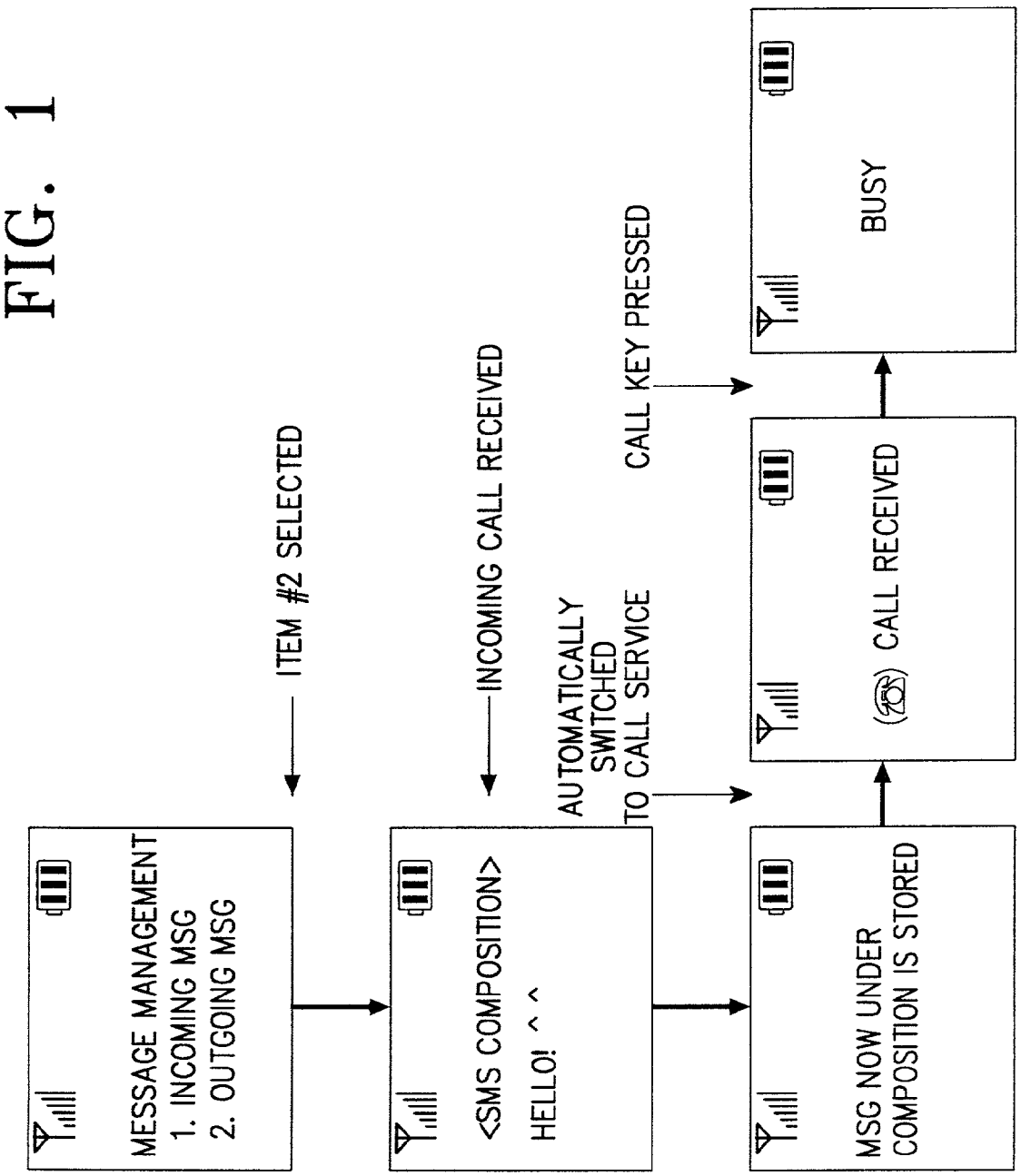
FIG. 1 is a diagram for illustrating how a conventional mobile terminal operates upon receipt of an incoming telephone call during an additional service.
Figure 2:
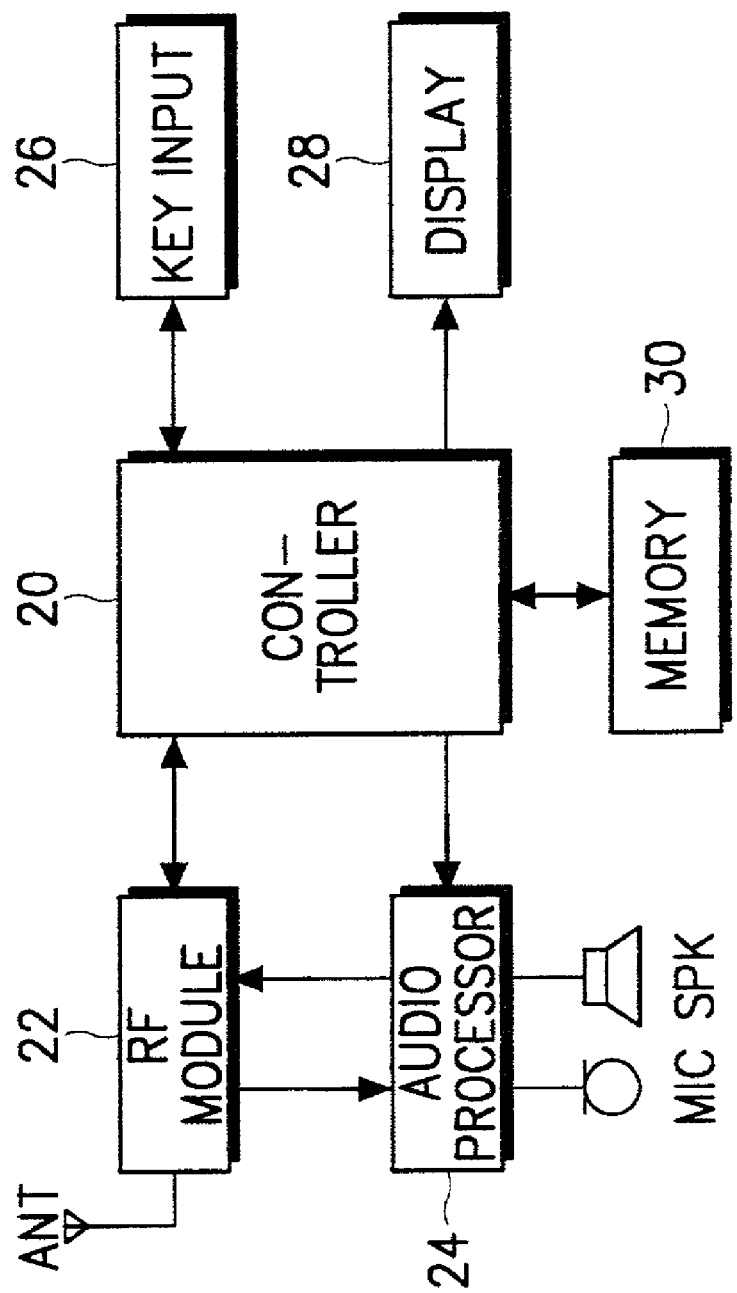
FIG. 2 is a block diagram illustrating a mobile terminal to which the present invention is applied.

FIG. 2 illustrates a block diagram of a mobile terminal to which the present invention is applied. Referring to FIG. 2, a controller 20 controls the overall operation of the mobile terminal. An RF (Radio Frequency) module 22 controls transmission and reception of audio data and signaling data under the control of the controller 20. An audio processor 24, under the control of the controller 20, converts the audio data received from the RF module 22 to an analog audio signal and outputs the analog audio signal through a speaker SPK as an audible signal. Further, the audio processor 24 converts an audio signal received through a microphone MIC to digital audio data and provides the digital audio data to the RF module 22. A key input unit 26 includes a plurality of alphanumeric keys and function keys, and provides the controller 20 with key input data generated according to a key input by the user. A display unit 28 displays various messages under the control of the controller 20. A memory 30 includes a program memory for storing a control program of the mobile terminal and a data memory for storing data generated during execution of the control program.

In an exemplary embodiment of the present invention, the key input unit 26 includes a separate Priority Set/Release shortcut key for setting and releasing priority to the various services of the mobile terminal, including the telephone call service and the additional services. Further, the mobile terminal also includes a separate Priority Set/Release menu item used for setting and releasing the priority.

Once the user sets priority to a desired one of the additional services using the Priority Set/Release shortcut key and/or the function key, the mobile terminal will maintain the selected additional service, even upon receipt of an incoming telephone call during the selected additional service.

Figure 3:
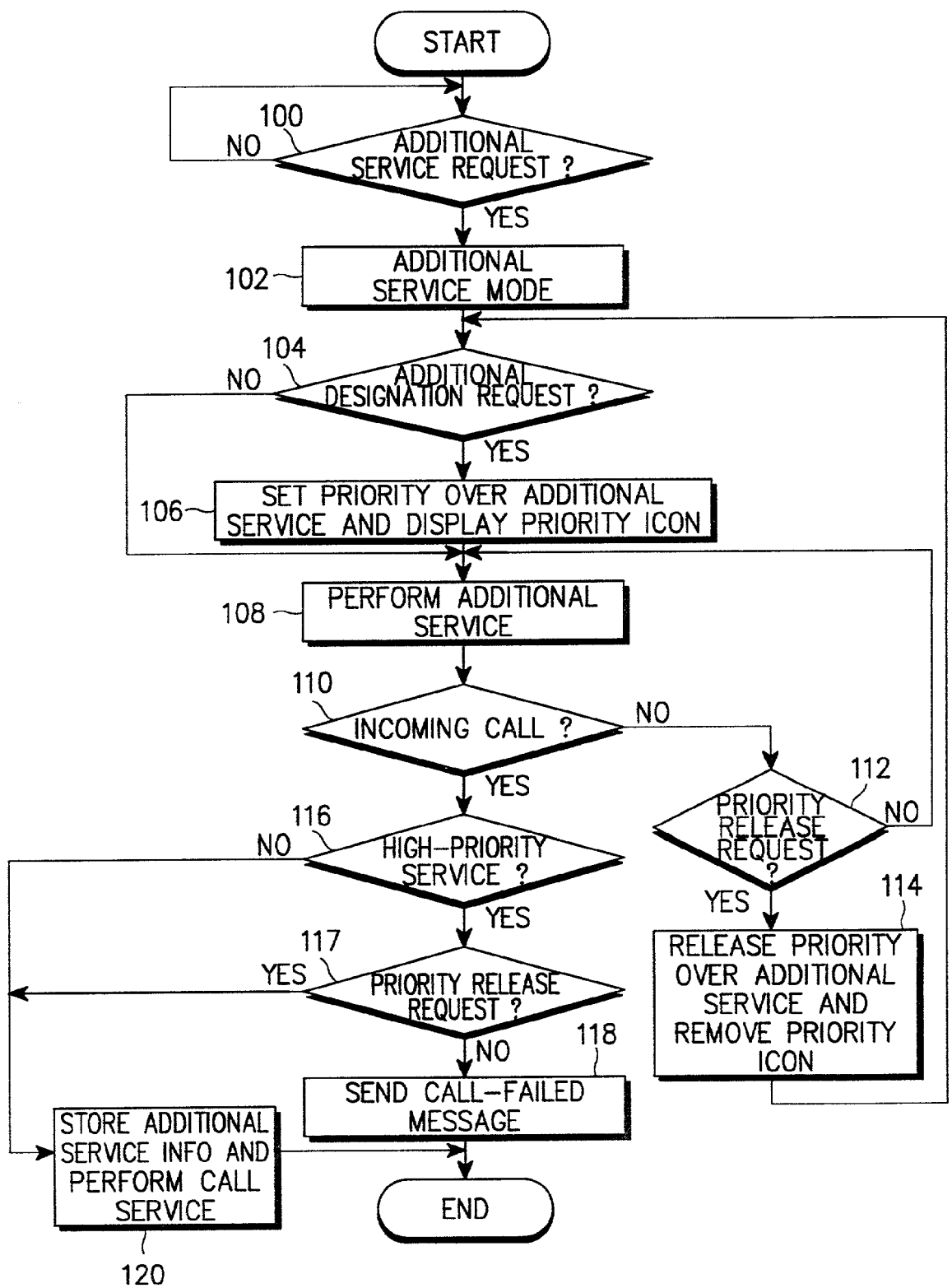
FIG. 3 is a flow chart illustrating a procedure for giving preference to an additional service in a mobile terminal according to an embodiment of the present invention.
Figure 4:
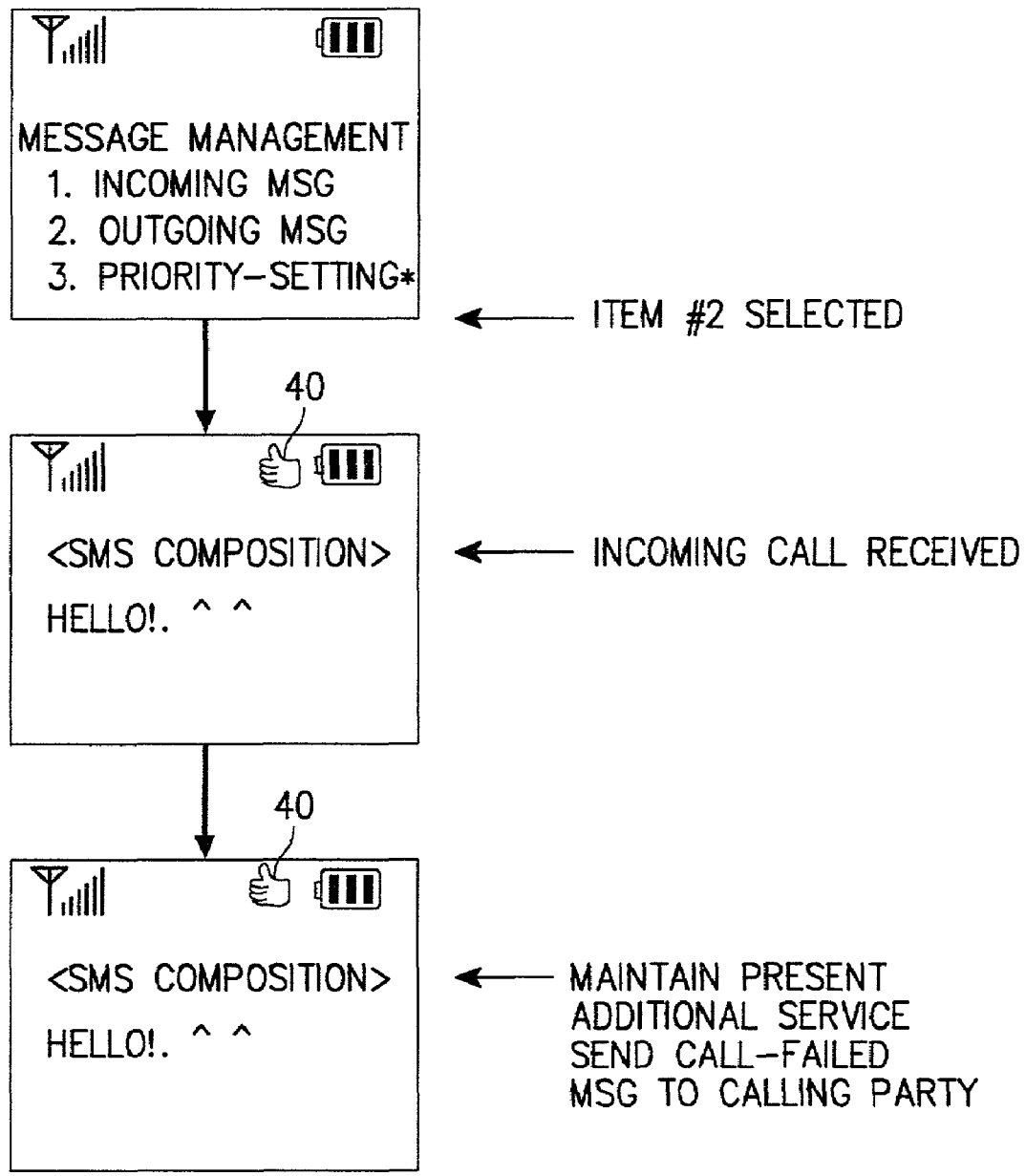
FIG. 4 is a diagram for illustrating how a mobile terminal operates upon receipt of an incoming telephone call during an additional service according to an embodiment of the present invention.

FIG. 3 illustrates a procedure for giving preference to an additional service in a mobile terminal according to an embodiment of the present invention, and FIG. 4 is a diagram for explaining how the mobile terminal operates upon receipt of an incoming telephone call during an additional service according to an embodiment of the present invention.

Now, an operation of the present invention will be described in detail with reference to FIGS. 2 to 4.

The mobile terminal provides a plurality of additional services as well as the telephone call service. In order to designate (or set) priority over a desired additional service, the user should first request the desired additional service by, for example, selecting the desired additional service menu item using the function key. The controller 20 of the mobile terminal then determines in step 100 whether an additional service request is received from the user. If the additional service request is received, the controller 20 enters the corresponding additional service mode in step 102.

In the corresponding additional service mode, the user may request designation of priority over the corresponding additional service using the Priority Set/Release shortcut key. Preferably, the Priority Set/Release shortcut key is toggled between a priority set mode and a priority release mode, each time it is pressed by the user. That is, when the user first presses the Priority Set/Release shortcut key, the corresponding additional service is designated as a high-priority service. If the user presses the Priority Set/Release shortcut key once again, priority to the corresponding additional service is released. Preferably, a specific priority designation icon is formed on the surface of the Priority Set/Release shortcut key to help the user recognize the Priority Set/Release shortcut key. In addition, in the corresponding additional service mode, the user can also request designation of priority over the corresponding additional service by selecting a priority setting mode by pressing the function key.

Upon receipt of a priority designation request from the user in the corresponding additional service mode, the controller 20 proceeds from step 104 to step 106. In step 106, the controller 20 designates the corresponding additional service as a high-priority service and displays on the display unit 28 a "priority icon" indicating that the corresponding additional service is designated as a high-priority service. Preferably, the priority icon is, for example, a "thumbs-up" icon 40 shown in FIG. 4, so that the user can visibly recognize that the corresponding additional service is designated as the high-priority service. In addition, it is preferable that the priority icon 40 should be identical to the icon formed on the surface of the Priority Set/Release shortcut key prepared in the key input unit 26.

After step 106, the controller 20 performs the corresponding additional service in step 108. Here, the controller 20 performs the SMS service by way of example. Upon receipt of an incoming telephone call from a calling party during the additional service (i.e., the SMS service), the controller 20 proceeds from step 110 to step 116. The controller 20 determines in step 116 whether the corresponding additional service is designated as a high-priority service. If the corresponding additional service is designated as a high-priority service, the controller 20 determines in step 117 whether a priority release request is received from the user. If a priority release request is not received from the user, the controller 20 maintains the present additional service and sends the calling party a call-failed message in step 118. Here, sending the call-failed message is optional.

If it is determined in step 116 that the additional service is not designated as a high-priority service, or if it is determined in step 117 that the priority release request is received from the user, the controller 20 temporarily stores information about the corresponding additional service in the memory 30 and then performs the telephone call service, in step 120.

Further, even when an incoming call is not received during the additional service in step 110, the controller 20 determines in step 112 whether a priority release request is received from the user. This is the case where the user desires to release the priority designation just after designating the additional service as the high-priority service. Upon receipt of the priority release request in step 112, the controller 20 releases priority to the additional service and then removes the displayed priority icon 40 in step 114.

FIG. 4 shows how the mobile terminal according to the present invention operates upon receipt of an incoming call in a state where the SMS service is designated as the high-priority service. Upon receipt of an incoming call while the user makes an SMS composition in a state where the SMS service is designated as a high-priority service, the mobile terminal according to the present invention maintains the present SMS service and at the same time, sends a call-failed message to the calling party.

As described above, the mobile terminal according to the present invention can designate a desired one of the additional services as a high-priority service, thereby offering convenience to the user when he or she uses the additional service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A service method in a mobile terminal supporting a voice communication service and at least one additional service that does not support voice communication, comprising the steps of:

designating within the mobile terminal the at least one additional service as a high-priority service;

upon receipt at the mobile terminal of an incoming telephone call during use of the at least one additional service performing by the mobile terminal one of the at least one additional service and the voice communication service as the high-priority service.

2. The service method as claimed in claim 1, further comprising the step of informing the user that the at least one additional service is designated as a high-priority service, after designating the at least one additional service as a high-priority service.

3. The service method as claimed in claim 2, wherein the informing step comprises the step of displaying a priority icon on a display unit of the mobile terminal.

4. The service method as claimed in claim 1, further comprising the step of releasing priority over the at least one additional service, upon receipt of a priority release request from the user during the use of the at least one additional service.

5. The service method as claimed in claim 4, further comprising the step of informing the user of priority release after releasing priority over the at least one additional service.

6. The service method as claimed in claim 5, further comprising the step of removing a priority icon displayed on a display unit of the mobile terminal in the step of informing the user of priority release.

7. A service method in a mobile terminal supporting a voice communication service and at least one additional service that does not support voice communication, comprising the steps of:

designating within the mobile terminal the at least one additional service as a high-priority service; and upon receipt at the mobile terminal of a priority release request from the user during the at least one additional service, releasing by the mobile terminal priority over the at least one additional service.

8. The service method as claimed in claim 7, further comprising the step of informing the user of priority designation and release over the at least one additional service, after designating and releasing priority over the at least one additional service, respectively.

9. The service method as claimed in claim 8, further comprising the step of displaying a priority icon on a display unit of the mobile terminal in the step of informing the user of priority designation.

10. The service method as claimed in claim 8, further comprising the step of removing a priority icon displayed on a display unit of the mobile terminal in the step of informing the user of priority release.

11. The service method as claimed in claim 7, wherein the user makes the priority designation request and the priority release request by pressing a priority set/release shortcut key.

12. The service method as claimed in claim 7, wherein the user makes the priority designation request and the priority release request by pressing a function key.

13. A service method in a mobile terminal supporting a voice communication service and a plurality of additional services that do not support voice communication, the mobile terminal capable of designating and releasing priority over a selected one of the additional services, comprising the steps of:

upon receipt at the mobile terminal of an incoming telephone call during a selected one of the additional services, determining by the mobile terminal whether the selected additional service is designated as a high-priority service;

maintaining by the mobile terminal the selected additional service, when the selected additional service is designated within the mobile terminal as the high-priority service; and sending by the mobile terminal an originating mobile terminal an outgoing message indicating that the terminating mobile terminal is busy.

14. The service method as claimed in claim 13, further comprising the step of performing the telephone call service upon receipt of a priority release request from the user before maintaining the selected additional service.

* * * * *